United States Patent [19]
Vache

[11] 4,177,828
[45] Dec. 11, 1979

[54] TAPPING OF GAS FROM A CARTRIDGE

[75] Inventor: Marcel Vache, Sainte-Foy-Les-Lyon, France

[73] Assignee: Application des Gaz, Paris, France

[21] Appl. No.: 883,962

[22] Filed: Mar. 6, 1978

[30] Foreign Application Priority Data

Mar. 8, 1978 [FR] France ............ 78 07739

[51] Int. Cl.[2] ............ F16K 43/00; B67B 7/24

[52] U.S. Cl. ............ 137/318; 222/5; 222/83.5; 431/344

[58] Field of Search ............ 137/315, 318, 70, 71, 137/320, 321, 322, 323; 222/5, 83, 83.5, 88; 431/344

[56] References Cited

U.S. PATENT DOCUMENTS

| | | | |
|---|---|---|---|
| 2,336,708 | 12/1943 | Ward | 222/5 |
| 2,853,126 | 9/1958 | Corlet | 431/344 |
| 2,890,815 | 6/1959 | Corlet | 431/344 |
| 3,246,801 | 4/1966 | De Boer | 222/83 |
| 3,326,231 | 6/1967 | Hogg | 137/318 |
| 3,428,075 | 2/1969 | Wagner | 137/318 |
| 3,459,331 | 8/1969 | Hogg | 137/318 |
| 3,913,609 | 10/1975 | Remane | 137/322 |
| 4,018,246 | 4/1977 | Langstroth | 137/318 |
| 4,082,993 | 4/1978 | Oakes | 137/322 |

FOREIGN PATENT DOCUMENTS

| | | | |
|---|---|---|---|
| 644232 | 9/1962 | Italy | 222/5 |
| 659674 | 10/1951 | United Kingdom | 222/83.5 |

*Primary Examiner*—Martin P. Schwadron
*Assistant Examiner*—G. L. Walton
*Attorney, Agent, or Firm*—Dowell & Dowell

[57] ABSTRACT

In a device for tapping gas from a gas-containing cartridge, there is provided a screw socket into which a threaded end of a tap forming part of a gas-using appliance is screwed, a piston spring-loaded in the direction of the end of the socket and bearing at its end sealing means engaging the cartridge, a perforating needle mounted on the socket and extending through the piston, and stop means to limit the travel of the piston under the action of its spring. The piston is hollow and of larger diameter than the socket which latter extends into a bore in the piston, the piston sliding over and outside the socket. By this means, the risk of seizure of the piston in prolonged use of the device is considerably reduced.

11 Claims, 4 Drawing Figures

TAPPING OF GAS FROM A CARTRIDGE

The present invention relates to devices for tapping gas.

The improvements which form the subject of the present invention aim at eliminating disadvantages of the known devices concerning the exposure of the bore wall of the socket to the open air which can then oxidise and cause seizure of the piston which slides in relation to the previously mentioned bore wall.

The tapping device according to the invention comprises a socket, a piston sliding on the latter, resiliently loaded in an axial direction with respect to said socket and provided at its end with means for sealing against a cartridge, a perforating needle mounted on the socket and at least partly housed inside the piston, and stop means provided to limit the travel of the piston under the action of its resilient loading, the piston being hollow and sliding over and outside the socket.

The attached drawings, given as an example, enable better comprehension of the invention, its characteristics and the advantages it can obtain:

Figure 1:
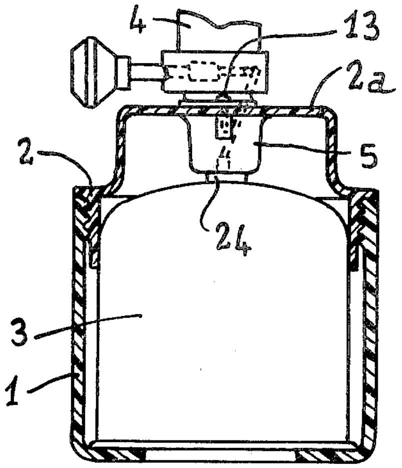
FIG. 1 is a partial longitudinal section of an apparatus comprising a device for tapping gas according to the invention.

FIG. 1 shows a container 1 closed by a cover 2 which contains a cartridge 3 of pressurised gas in a gaseous and/or liquid state. It can be seen that the cover 2 screws to the box 1 in such a way that its upper face 2*a* moves nearer the bottom of the box as will be explained more clearly later. A tap is attached to cover 2, the said tap forming part of a gas applicance for cooking, lighting, heating etc. The tap 4 is connected to the cartridge 3 by means of a gas tapping device according to the invention, shown more clearly in FIG. 2.

The central part of the face 2*a* of the cover is rotated with a boss 5 turned towards the inside of the box, and comprising a bore 6 in a cone shape, i.e. it has an end part 7 of reduced diameter forming a shoulder 8 turned upwards.

The face 2*a* of the cover 2 is provided with a recess 9 concentric to bore 6 and in which is placed the peripheral flange 10 of a fixed socket 11. This flange is kept in position by a clamp 12 secured to face 2*a* of the cover by the screw 13 (FIG. 1). A notch 14*a* is provided at the periphery of the head 14 of the socket 11, below flange 10, to work in conjunction with a dog 6*a* formed in bore 6. The socket 11 is thus immobilised axially and angularly in relation to the cover 2.

The socket 11 comprises a head 14 from which the flange 10 starts, and a body 15 of a lesser diameter than that of the head so that it forms a shoulder 16 with this head. At the level of its extremity, body 15 is hollowed with a groove 15*a* in which an O-ring 17 is placed.

Between the boss 5 and the body 15 of the socket 11, there is disposed a ring or hollow piston 18, in the bore 19 of which the body 15 of the socket 11 engages with a suitable functional clearance. The mobile ring 18 has an external surface with two diameters which are chosen to be lower than the bores 6 and 7 respectively of the boss 5. Thus the periphery of the ring 18 has a shoulder 20 which is supported by the shoulder 8 of the boss 5 by the action of the elastic load of a compression spring 21 surrounding the body 15 of the socket 11; this is supported by the shoulder 16 of the socket 11 and the upper annular face 22 of the ring 18 respectively. Thus the travel of the piston 18 by the action of the resilient load 21 finds itself stopped by the stop 8. The lower extremity of the latter has a recess 23 in which a sealing joint 24 is embedded which has a central opening 24*a* connecting with a perforation 25 made in the transverse bottom of the ring 18.

Figure 3:
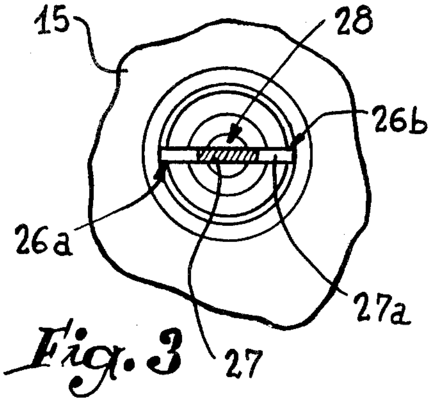
FIG. 3 is a section on III—III (FIG. 2).
Figure 2:
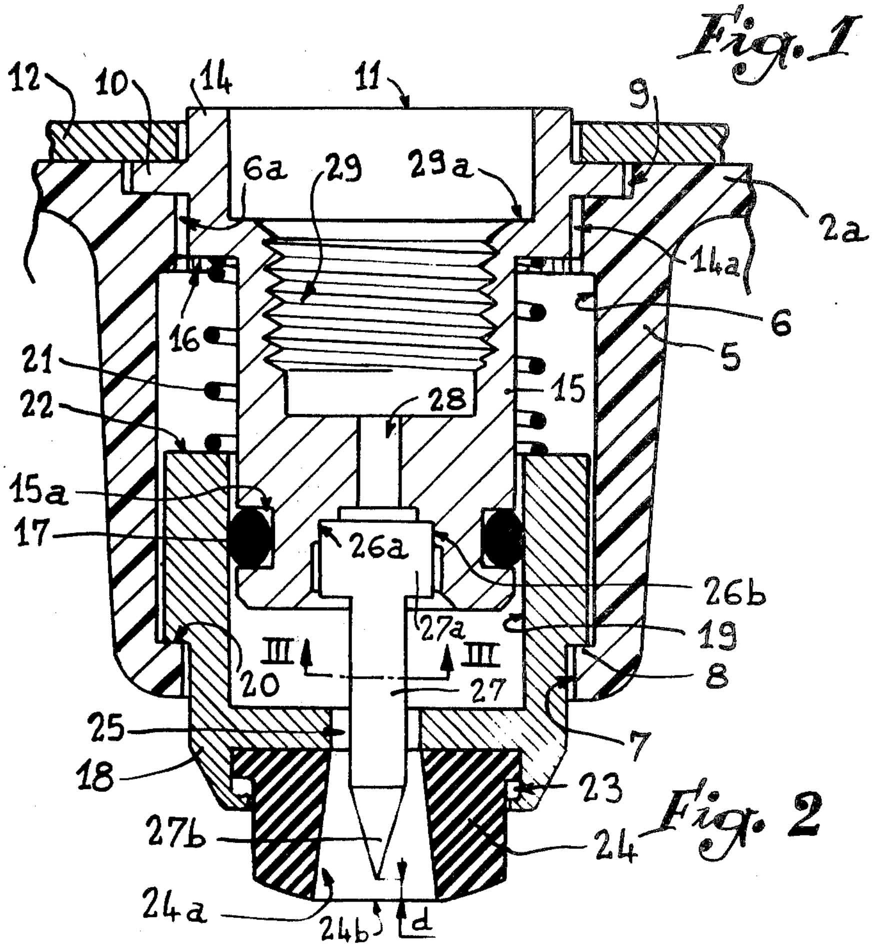
FIG. 2 shows the tapping device on a larger scale, mounted in the cover of the container in FIG. 1.
Figure 4:
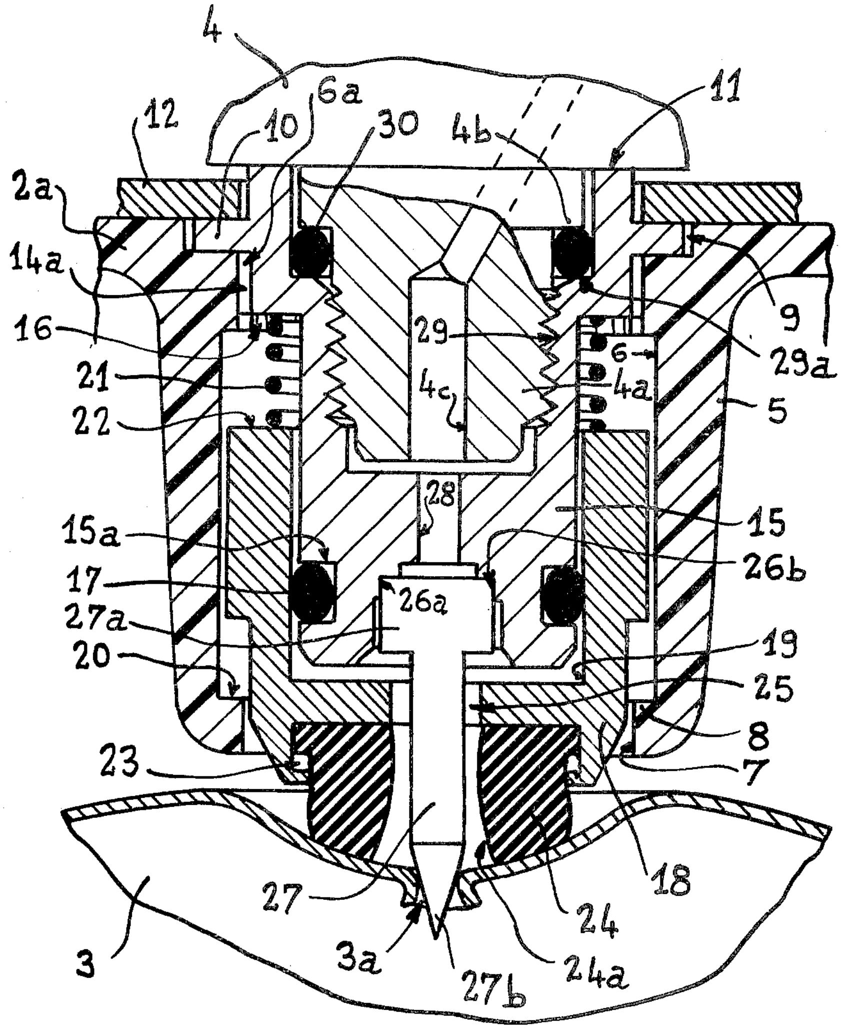
FIG. 4 is a view similar to that in FIG. 2 but showing the device of the invention attached to a stop cock and after perforation of the cartridge.

As shown in FIG. 3, the projecting body 15 of the socket 11 has a cylindrical end cavity 26 comprising two diametrally opposite notches 26*a* and 26*b* in which the head 27*a* of the perforating needle plate 27 is force fitted. As FIGS. 2 and 3 show, the latter is not very thick (for reasons which will be better explained later) and it is housed at least partly inside the ring 18. In any case, it will be noted that when the appliance for cooking, lighting, etc. is not coupled to a cartridge 3, the end of the sharp point 27*b* of the needle 27 is found at a specific distance d retracted from the lower face 24*b* of the sealing joint 24 (FIG. 2).

An axial channel 28 leaves the cavity 26 and opens into a tapped hole 29 suitable for receiving the threaded end 4*a* of the tap 4. A sealing joint 30 is placed between a shoulder 29*a* of the hole 29 and another shoulder 4*b* provided at the base of the end fitting 4*a*.

When it is required to connect the tap 4, integral with a gas-using appliance, to the cartridge 3 contained in the container 1, the cover 2 is screwed onto the latter so as to bring the tapping device nearer to the top of the cartridge.

As screwing progresses, the sealing joint comes nearer the cartridge to finally abut against it forming a tight seal around the perforation zone. By continuing screwing, an axial sliding is caused towards the top of the ring 18 in relation to the socket 11 inside the bore 6 of the boss 5; because of this the body 15 of the socket 11 penetrates more and more into the bore 19 of this ring to such an extent that the sharp point 27*b* of the needle 27 penetrates while turning into the top of the cartridge 3 to form an opening 3*a* inside this; the gas escapes through this opening, passing successively through the central opening 24*a*, the perforation 25, the spaces located on each side of the flat head 27*a* of the needle in the cavity 26, and the pipe 28 to penetrate into the tap through its feeder 4*c*.

It is understood that if the appliance which is integral with the tap 4 has to remain connected to the cartridge 3 for a very long time, the bore 19 of the ring 18 covers and protects the main part of the lateral surface of the body 15 so that this surface cannot be altered by oxidation and/or dust deposits. In this way, when the cartridge 3 is empty and the cover 2 is removed from the box 1, the ring 18 is returned to its initial position in FIG. 2 by the loading of the spring 21. Seizure risks, which were relatively high in former gas tapping devices prior to the present invention are now substantially reduced.

Furthermore, this result is confirmed by practical tests carried out in a saline atmosphere with elements of the same type, i.e. the socket made from an aluminum alloy called AU12 and the ring in brass. In such conditions, it was observed that a gas tapping device as in the invention resists seizure 2 or 3 times longer than previous devices.

Of course, any other type of closing system could be connected with the socket 11, for example an axial tap such as that described in the French Pat. No. 1,508,285.

Moreover, it should be understood that the preceding description is only given as an example and does not impose limits in any way on the scope of the invention, which contemplates also replacement of the operational elements described by any other equivalent means.

I claim:

1. A tapping device for use in a gas appliance for tapping gas from a puncturable and disposable gas cartridge, comprising:

a body having an axially elongated outer surface, having an appliance receiving socket at one end and having an axial channel extending from the socket through the body;

a perforating needle fixed to the body in alignment with the axial channel and extending beyond the other end of the body and operative to puncture a cartridge when the body is moved axially to drive the needle thereinto;

a ring surrounding the body with a functional clearance enabling axial sliding of said ring over and outside said body;

spring means operative between the ring and the body to resiliently urge the ring toward said other end of the body; and annular sealing means carried by the ring, the sealing means surrounding the perforating needle and being normally urged by the spring means beyond the needle, the sealing means being operative to seal against the cartridge under the pressure of the spring means when the perforating needle is driven into the cartridge.

2. The tapping device as claimed in claim 1, wherein the axial length of the ring is sufficient to cover a major portion of the elongated outer surface of the body when the perforating needle is driven into a cartridge.

3. The tapping device as claimed in claim 2, wherein said body has an annular groove around its outer surface, and an O-ring seal in said groove and disposed to seal against the surrounding ring.

4. The tapping device as claimed in claim 1, wherein the gas appliance is directly fixed to the body.

5. The tapping device as claimed in claim 1, wherein the spring means acts upon the opposite end of the ring from the annular sealing means and is operative to urge the ring and the sealing means at the other end of the ring toward the gas cartridge.

6. In gas appliance apparatus having a container shaped for receiving a puncturable and disposable gas cartridge and having a cover securable to said container and having a central bore extending therethrough toward a cartridge contained therein, a tapping device comprising:

a body mounted in said cover and having an axially elongated outer surface extending into the bore, and the body having an appliance receiving socket facing outwardly of the cover and having an axial channel extending from the socket through the body and opening inwardly of the cover;

a perforating needle fixed to the body in alignment with the axial channel and extending beyond the body inwardly of the cover, the needle being located to perforate a cartridge in the container when the cover is secured thereto.

a ring surrounding the body with a functional clearance enabling axial sliding of said ring over and outside said body;

spring means located between the body and the ring and operative to resiliently urge the ring axially along the body inwardly of the cover; and annular sealing means carried by the ring, the sealing means surrounding the perforating needle and being normally urged beyond the needle by the spring means, the sealing means being operative to seal against a cartridge contained inside the container under the pressure of the spring means when the cover is secured to the container and the needle has perforated the cartridge.

7. The tapping device as claimed in claim 6, wherein the cover has a body-receiving part extending toward said container and forming said central bore, the part having a bore-restricting annular shoulder located inwardly of the cover beyond the body, said annular shoulder engaging the ring and forming a stop to limit the axial travel of the ring toward said container under the pressure of the spring means.

8. The tapping device as claimed in claim 6, wherein the body has a mounting head therearound facing outwardly of the cover, and means for clamping the head to the cover.

9. The tapping device as claimed in claim 8, wherein the head and cover have mutually interfering notch and dog means cooperating to prevent rotation of the body with respect to the cover when clamped thereto.

10. The tapping device as claimed in claim 6, wherein the gas appliance is directly fixed to the body.

11. The tapping device as claimed in claim 6, wherein the spring means acts upon the opposite end of the ring from the annular sealing means and is operative to urge the ring and the sealing means at the other end of the ring toward the gas cartridge.

* * * * *